United States Patent [19]

Robinson

[11] 4,099,166

[45] Jul. 4, 1978

[54] FUEL SAFETY SWITCH

[76] Inventor: Charles Elbert Robinson, Livermore, Colo. 80536

[21] Appl. No.: 691,901

[22] Filed: Jun. 1, 1976

[51] Int. Cl.² ............................................. G08B 21/00
[52] U.S. Cl. ................................. 340/626; 123/142; 200/83 D; 340/605; 340/611
[58] Field of Search ................. 340/240, 242, 244 E, 340/60; 123/142; 200/81.4, 83 D, 83 N, 83 Y

[56] References Cited

U.S. PATENT DOCUMENTS

| | | | |
|---|---|---|---|
| 1,231,561 | 7/1917 | Briggs | 340/60 |
| 2,767,392 | 10/1956 | Szwargulski | 340/242 |
| 3,911,393 | 10/1975 | Biggs | 200/83 N X |

FOREIGN PATENT DOCUMENTS 825,277  10/1969  Canada ........................... 200/83 D Primary Examiner—Harold I. Pitts
Assistant Examiner—Daniel Myer
Attorney, Agent, or Firm—Burton & Dorr

[57] ABSTRACT

A fuel safety switch for the fuel system of a motor is designed to be placed in the fuel delivery system and includes a bellows responsive to the pressure of the fuel within the fuel system for expansion outwardly, coil springs disposed on both sides of the bellows to provide a snap action return of the bellows to a collapsed condition after a reduction in fuel pressure, a first set of contacts activating an over fuel indicator when the bellows is expanded beyond a predetermined limit, and a second set of contacts activating the motor brake retarders, if turned on, when the bellows collapses to the unexpanded state.

7 Claims, 4 Drawing Figures

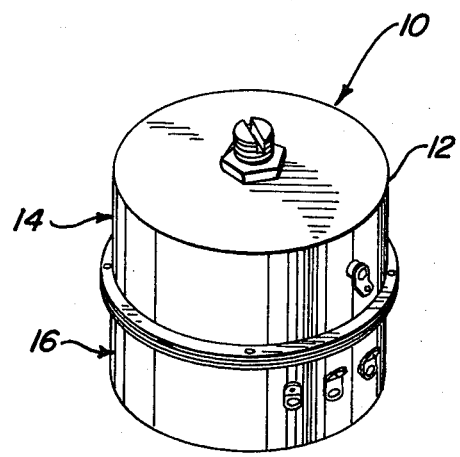
Fig_1
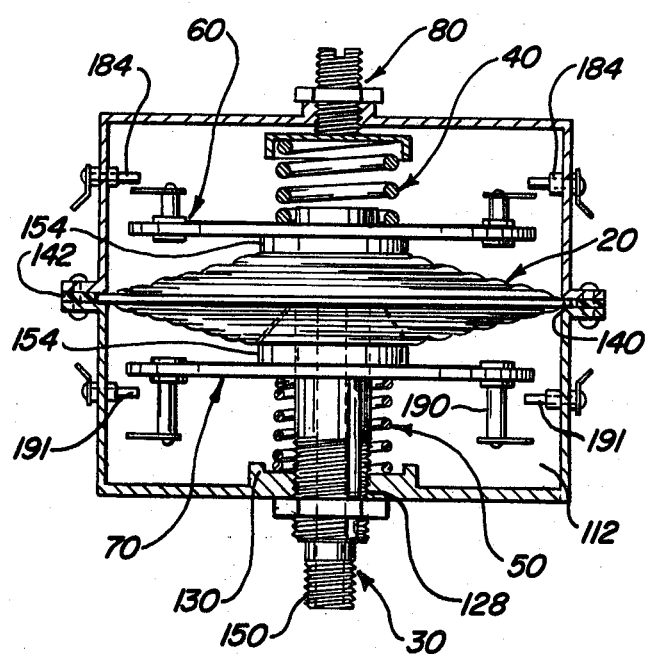
Fig_2
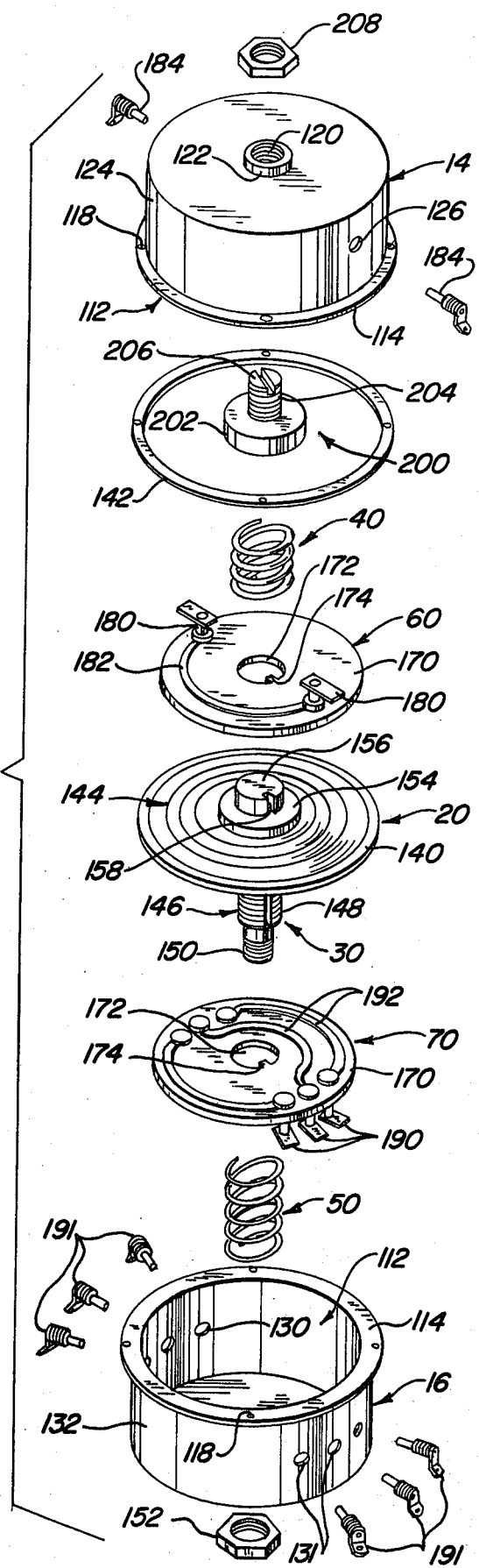
Fig_3

FUEL SAFETY SWITCH

BACKGROUND OF THE INVENTION

1. Field of the Invention

The present invention relates generally to fuel safety switches and more particularly to a fuel safety switch that activates motor brake retarders and an over fuel indicator.

2. Description of the Prior Art

Pressure sensors and detectors have long been in use for closing electrical contacts in response to pressure changes.

None of the prior art approaches, however, have been specifically adapted to the environment of a motor including the activation of the motor brake retarders when the pressure of the fuel within the system drops below a predetermined low value and activates an over fuel indicator when pressure of the fuel in the system exceeds a predetermined high value.

OBJECTS OF THE INVENTION

It is an object of the present inventon to provide a novel device for activating the brake retarders of a motor only when the fuel pressure of the fuel delivery system in said motor falls below a predetermined value.

It is another object of the present invention to provide a novel fuel safety switch interconnected with the fuel delivery system of a motor for activating an over fuel indicator only when the pressure of the fuel in the fuel delivery system exceeds a predetermined high value.

It is still another object of the present invention to provide a fuel safety switch for connection to a fuel delivery system wherein electrical contacts are closed when the pressure of the fuel in the system exceeds a predetermined high value to activate an over fuel indicator and wherein additional electrical contacts close when the fuel pressure drops below a predetermined low value thereby activating the motor brake retarders.

It is still another object of the present invention to provide a novel fuel safety switch interconnected with the fuel delivery system of a motor and with the motor brake retarders wherein the fuel pressure is delivered into a bellows which expands outwardly against the force of counteracting biasing springs to close an electrical contact when the pressure exceeds a predetermined high thereby activating an over fuel indicator and wherein when the bellows is collapsed under the force of the biased springs, a second set of contacts is closed to provide power to the brake retarder system.

SUMMARY OF THE INVENTION

The present invention comprises a durable, compact fuel safety switch which is quickly and easily mounted into a conventional fuel delivery system of a motor and includes an air-tight housing in which is disposed a mechanical bellows, the interior of which is interconnected in fluid-tight communication with the fuel pressure of the delivery system. A first coil spring is disposed between the upper surface of the bellows and the top of the housing and contains an adjustment for varying the spring tension of the coil. A second coil spring is disposed between the lower surface of the bellows and the bottom of the housing. The two coil springs operate to rapidly collapse the bellows in the event that the fuel pressure in the delivery system falls. A first set of electrical contacts becomes closed when the upper surface of the bellows expands upwardly against the bias of the coil spring and electrical contacts are positioned so that closure occurs only when the pressure in the bellows exceeds a predetermined high value. The adjustment of the coil spring disposed on top of the bellows adapts the fuel safety switch of the present invention to the differing fuel pressures apparent in different motors. A second set of electrical contacts close when the bellows is in the fully collapsed state. The closures of the second set of electrical contacts extends power to the motor brake retarders for activation thereof.

Other objects, advantages and capabilities of the present invention will become more apparent as the description proceeds taken in conjunction with the accompanying drawings.

DESCRIPTION OF THE DRAWINGS

FIG. 1 is a perspective view of the fuel safety switch of the present invention.

FIG. 2 is a cross-sectional view illustrating the various components of the fuel safety switch of the present invention.

FIG. 3 is an exploded view of the fuel safety switch of the present invention.

DESCRIPTION OF THE PREFERRED EMBODIMENT

Figure 4:
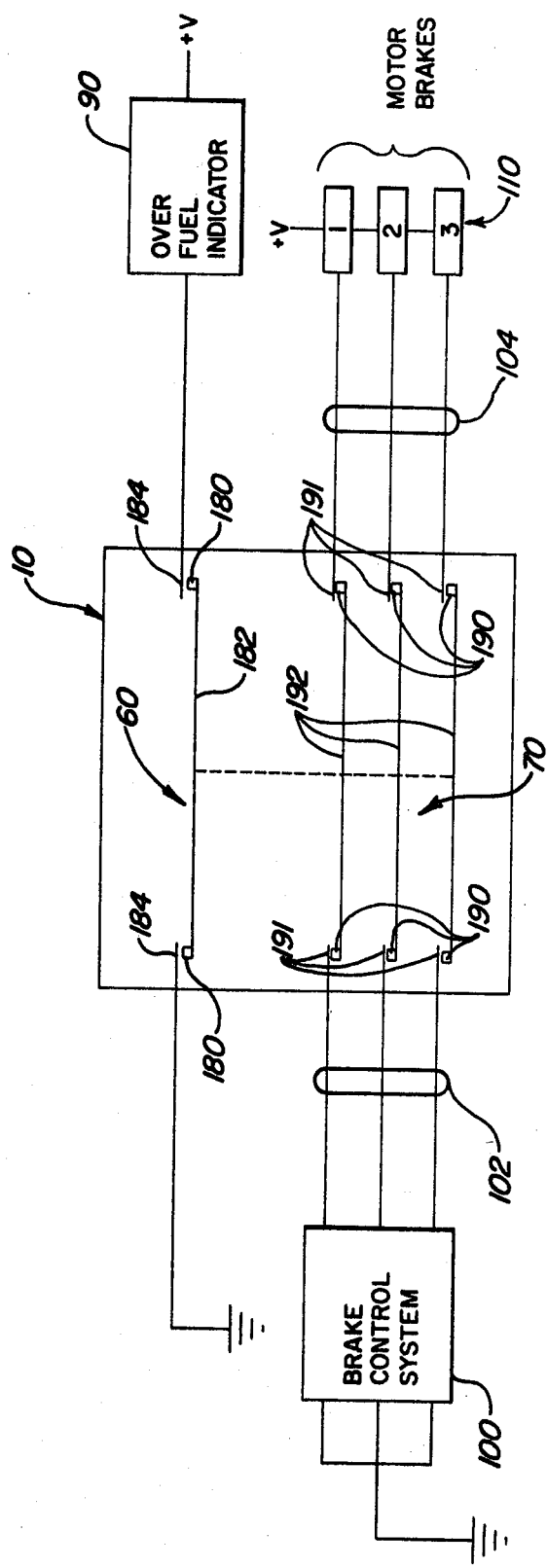
FIG. 4 illustrates the electrical wiring of the fuel safety switch of the present invention.

The fuel safety switch 10 of the present invention is shown in FIG. 1 to have an air tight waterproof housing 12 having an upper section 14 and a lower section 16 interconnected in a sealed relationship. The housing 12 is substantially cylindrically shaped and contains, as shown in FIG. 2, a bellows 20, a fuel pressure intake 30 for delivering fuel pressure into the interior of the bellows 20, a set of counter-balancing coil springs 40 and 50 which provide a snap-action return in the event the pressure within the bellows 20 is reduced, a first set of electrical contacts 60 are provided to close and make electrical contact when the bellows 20 is in the fully expanded state, and a second set of contacts 70 are provided to make electrical contact when the bellows is in the fully collapsed state. Additionally, an adjustment means 80 is provided for adjusting the bellows 20 to varying pressures existent in conventional fuel delivery systems of motors.

The fuel safety switch 10 of the present invention, therefore, finds application for mounting into the fuel delivery system so that the bellows 20 responds to increasing and decreasing pressure of the fuel within the fuel delivery system. As will be further discussed in the ensuing, when the fuel pressure is above a predetermined maximum limit, the first set of electrical contacts 60 close, as shown in FIG. 4, to provide a ground indication through the electrical contact 60 and into an over fuel indicator light 90 thereby activating the light through to positive voltage. In operation, the motor which may be the power source for a truck, may be receiving too much fuel in which case the fuel pressure in the line exceeds a predetermined high value causing the closing of contacts 60 to provide a ground indication to the over fuel indicator 90 which provides a visual display to the operator of the truck. The over fuel indicator may comprise any conventional means for warning the truck driver that the predetermined high limit of fuel pressure in the line has been exceeded. This solves the common problem, often experienced by "green" or inexperienced truck drivers, wherein too much fuel is delivered into the motor causing incomplete combustion which is commonly represented by the black smoke coming from the exhaust. The provision of the over fuel indicator 90, provides instantaneous feedback to the operator of the truck so that he can release sufficient pressure from the throttle to cause the light 90 to go out. The over fuel indicator 90, therefore, in conjunction with the closing of the electrical contacts 60 enables the operator of the truck to operate the truck with increased fuel mileage and corresponding decreased air pollution and emissions.

The closing of contacts 70 extends the brake control signals from the brake control system 100 over leads 102 into the electrical contacts 70 which close when bellows 20 is fully collapsed to leads 104 and into the motor brakes 110. Motor brakes 110 are conventional and of the type manufactured by Jacobs Manufacturing Co., West Hartford, Conn. 06110 and the brake control system may comprise any conventional system including that of a throttle microswitch or that disclosed in copending application Ser. No. 691,724, Filed June 1, 1976, entitled "Motor Brake Control System" by Robinson and Nieberger. The provision of contacts 70 interrupting the brake control system delivery of signals to the motor brakes 110 substantially eliminates a common problem plaguing the operation of trucks. Currently, when the brake control system 100 issues retardation signals over lead 102 directly into the motor brakes 110, when the motor brakes are activated, there is a lag of fuel pressure still being delivered in the fuel delivery system to the cylinders. This lag of fuel pressure is sufficiently long and of sufficient quantity to cause a surplus of fuel to build up in the cylinders before retardation so that when retardation occurs, large popping noises eminate due to the explosions occurring in the cylinders. Such "popping" from the explosions cause considerable noise pollution when trucks travel in metropolitan areas with the start and stop traffic. Furthermore, the explosions create undue stress and strain onto the motor brakes 110 and the motor itself thereby necessitating increased repair and overhauls. Such stress and strain is eliminated by the fuel safety switch 10 of the present invention since even though the brake control system 100 is generating retardation signals on lead 102, these signals are not extended to the motor brake 110 until the pressure in the bellows 20 has been substantially reduced enabling closure of contacts 70. Therefore, in operation, any fuel lag after release of the throttle by the operator is first combusted before any retardation by the motor brake 110 on the clyinders of the motor can occur.

The housing 10 comprises an upper portion 14 and a lower portion 16. The two portions 14 and 16 are substantially identical in configuration each comprising an internal cavity 112, outwardly directed flanges 114 and a plurality of holes 118 formed circumferentially around the flange portion 114 so that the upper portion 14 can be affixed to the lower portion 16 as shown in FIG. 1. Formed in the center of the upper portion 14 is a threaded passageway 120 having an upstanding collar portion 122, formed in the cylindrical sides 124 are two opposing holes 126, and formed in the center of the bottom portion 16 is a threaded passageway 128 and a circular stop 130 disposed upwardly in the center of the cavity 112. Three directly opposing pairs of holes 131 are formed in the sides 132 of the bottom cylindrical portion 16.

The bellows 20 is disposed in the internal cavity 112 as shown in FIG. 2. The outer circular flange 140 is positioned between the flange portions 114 of the upper and lower segments 14 and 16. Disposed around the outer circumference of the bellows 20 is a gasket 142 to provide an air-tight relationship between the upper portion 14 and the lower portion 16 when the two portions are disposed over the bellows 20 as shown in FIG. 2.

The bellows 20 includes the center expanding portion 144, a downwardly extending threaded tube 146 having an enlarged threaded area 148 and downwardly extending therefrom a smaller threaded stud portion 150. The threaded stud portion 150 enables attachment of the fuel safety switch 10 of the present invention into the fuel delivery system in a conventional fashion. The enlarged threaded section 148 engages threaded passageway 128 and nut 152. Nut 152 firmly affixes the bellows 10 to the lower portion 16 of housing 12. Directly opposing each other on the outer center surface of the expanding portion 144 are two integral uplifted circular pads 154. Disposed centrally and upwardly from circular pad 154 is an upward circular protrusion 156 having a keyway 158 defined thereon.

As shown in FIGS. 2 and 3, the upper electrical contact assembly 60 comprises a circular member 170 manufactured from insulating material having formed in the center thereof a circular hole 172 with a key 174 defined therein. The diameter of the hole 172 is slightly larger than the diameter of the circular protrusion 156 and the circular member 170 is designed to press-fit over the protrusion 156 so that the key 174 positively engages the keyway 158. In this manner, the circular insulating member 170 is held firmly affixed in one orientation. Disposed on opposing ends of the circular member 170 are two upstanding electrical contacts 180. A strip of conducting material 182 is deposited on the upper surface of the insulating member 170 to provide an electrical extension between the two electrical contacts 180. Mating contacts 184 are disposed through the formed holes 126 in the cylindrical sides 124 of the upper portion of the housing 14. These contacts 184, as shown in FIG. 2, extend inwardly into the cavity portion 112 so that they may provide a positive engagement for the contacts 180 disposed on the circular member 170.

The second set of electrical contacts 70 comprise the same circular insulating member 70 having formed therein a circular hole 172 with a keyway 174. In the same manner as previously discussed, this circular insulating member 170 is press-fitted over a corresponding upstanding cylindrical portion as shown in FIG. 2. However, three pairs of electrical contacts 190 are disposed in an opposing relationship as shown in FIG. 3 and are interconnected by conducting material 192.

Coil springs 40 and 50 are disposed on opposing ends of the bellows 20. Coil spring 40 engages a circular adjustor 200 having a circular lower cavity portion 202 which is receptive of one end of the coil spring 40 and an upstanding stud portion 204 having a slot 206. The threaded stud portion 204 threadedly engages the threaded hole 120 in the upper portion 14 of the housing 12 and is connected thereto by a nut 208. In operation, the nut 208 is loosened and a screwdriver is inserted in slot 206 to selectively tighten or loosen the bias of spring 40. This permits the operator of the safety fuel switch 10 of the present invention to adjust the upper predetermined limit of gas pressure in the bellows 20 in order to adapt to the pressure of the motor. Once the proper adjustment has been made, the nut 208 is tightened over the threaded stud portion 206 to positively engage the housing 12.

While the present invention has been described with a certain degree of particularity, it is understood that the present disclosure has been made by way of example and that changes in detail of the structure may be made without departing from the spirit thereof.

I claim:

1. A fuel safety switch interconnected with the fuel delivery system of a motor and with the motor brake retarders, said fuel delivery system containing pressurized fuel, said fuel safety switch comprising:

means connected to said delivery system for extending said pressurized fuel, a bellows having an internal cavity in fluid-tight communication with said extending means and receptive of said pressurized fuel for expanding and contracting in response to the pressure of said fuel, at least one spring responsive to said expansion of said bellows for biasing against said bellows, said biasing means further comprising means cooperative with said spring for adjusting the degree of the tension in said spring, and means operative with said bellows for activating said brake retarders only when said bellows is substantially contracted.

2. The fuel pressure switch of claim 1 further comprising:

an indicator, and means operative with said bellows for activating said indicator only when said bellows is substantially in the fully expanded state.

3. A fuel safety switch interconnected with the fuel delivery system of a motor, said fuel delivery system containing fuel under pressure, said fuel delivery system comprising:

an air-tight housing, a bellows disposed in the interior of said housing, means interconnected in fluid-tight communication with the interior of said bellows and with the fuel delivery system for extending said pressure of said fuel in said delivery system to said bellows interior, said bellows being capable of expansion with increasing pressure of said fuel, a first coil spring disposed between the upper surface of said bellows and the top of said housing, a second coil spring disposed between the lower surface of said bellows and the bottom of said housing, a first set of electrical controls in said housing and exterior of said bellows operative with said upper surface of said bellows for closing when said bellows is substantially expanded against the bias of said springs, and a second set of electrical contacts interior of said housing and exterior of said bellows operative with said lower surface of said bellows for closing when said bellows is substantially contracted.

4. The fuel safety switch of claim 3 further comprising:

motor brake retarders, and means responsive to the closure of said first contacts for activating said motor brake retarders.

5. The fuel safety switch of claim 4 further comprising:

an indicator, and means responsive to the closure of said second contacts for activating said indicator.

6. A fuel safety switch interconnected with the fuel delivery system of a motor, said fuel delivery system containing fuel under pressure, said switch comprising:

a housing having cylindrical side walls extending the longitudinal length of said housing and having opposing end walls, said housing being comprised of separate sections joined at the longitudinal center plane of said housing, each of said sections having a circular flange extending around and external to the end of said section opposing said wall, said sections when joined at said center cooperating to provide a cylindrically shaped internal cavity, a bellows having a circular midsection region of greater diameter than said bellows, the aforesaid diameter being greater than the diameter of said internal cavity but less than the diameter of said flange, said midsection region being oriented at said center plane between said flanges of said separate sections, a circular gasket having a diameter greater than said diameter of said midsection region of said bellows and less than said diameter of said diameter of said flanges, said gasket being disposed around the outer periphery of said midsection region of said bellows between said flanges, means operative upon said flanges for attaching said separate sections together and for holding said gasket and said bellows in position, said gasket providing and air-tight seal for said internal cavity and said bellows being held in the center of said internal cavity, means through one end of said housing for delivering said fuel into the interior of said bellows, said bellows being capable of expanding in response to increasing fuel pressure and contracting in response to decreasing fuel pressure, at least one circular member of non-conductive material containing at least one conductive path extending from a first conductive pad on said member to a second conductive pad on said member, said at least one circular member being responsive to the expansion and contraction of said bellows for moving within said internal cavity in the direction of said longitudinal length of said housing, and an electrical contact disposed through the walls of said housing for abutting one of said pads upon said member moving to a unique position in said internal cavity.

7. A fuel safety switch interconnected with the fuel delivery system of a motor and with the motor brake retarders, said fuel delivery system containing fuel under pressure, said fuel safety switch comprising:

means connected to said fuel delivery system for sensing said pressure of said fuel, means cooperative with said sensing means for activating said brake retarders only when said pressure of said fuel in said fuel delivery system is below a predetermined value, and means cooperative with said sensing means for indicating when said pressure of said fuel in said delivery system is above a second predetermined value, said second predetermined value being greater than said first mentioned predetermined value.

* * * * *